Dec. 16, 1958  C. VON BASEL  2,864,997

MEASURING DEVICE

Filed Aug. 23, 1955

INVENTOR
CARL VON BASEL
BY Fred M. Vogel
AGENT

United States Patent Office 2,864,997
Patented Dec. 16, 1958

2,864,997

MEASURING DEVICE

Carl von Basel, Eindhoven, Netherlands, assignor, by mesne assignments, to North American Philips Company, Inc., New York, N. Y., a corporation of Delaware Application August 23, 1955, Serial No. 530,140

Claims priority, application Netherlands September 11, 1954

4 Claims. (Cl. 324—34)

The present invention relates to measuring apparatus. More particularly, the invention relates to measuring apparatus in which the magnitude to be measured is converted into an electrical voltage, which is modulated on an auxiliary alternating voltage, and the modulated alternating voltage is demodulated in a demodulator, in which, in addition, a non-modulated voltage derived from the auxiliary alternating voltage is operative.

The invention may be used particularly for measuring displacements or eccentricities of rotating shafts of machines. An electrical voltage is derived from the displacement or the eccentricity by means of a pick-up device. A possible method for this purpose will be described with reference to Figs. 1 and 2.

In order that the invention may be readily carried into effect, it will now be described with reference to the accompanying drawing, wherein.

Figure 1:
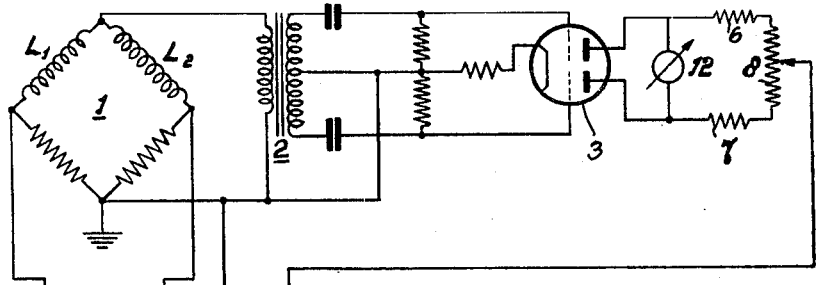
Fig. 1 is a schematic diagram of an embodiment of measuring apparatus.

Referring to Fig. 1, reference numeral 1 designates a bridge circuit, comprising two inductors L1 and L2 and two identical resistors. The bridge is connected to a secondary winding of a transformer 4 having a primary winding which is connected at 5 to an oscillator supplying an alternating voltage of a frequency of for example 50 to 500 cycles per second. The second bridge diagonal is connected to the primary winding of a transformer 2, having a secondary winding, the ends of which are connected via capacitors to the control-grids of a double triode 3 and the center of which is connected to the common cathode of the tube 3 and to ground. A second secondary winding of the transformer 4 supplies alternating current to the anode. This winding is, to this end, connected to ground at one end and at the other to the sliding contact of a potentiometer 8, which serves for the identical adjustment of the triodes of tube 3 and of which the ends are connected via resistors 6 and 7 to the anodes of said triodes. A direct voltage meter or a recording device 12 is connected between the anodes.

Figure 2:
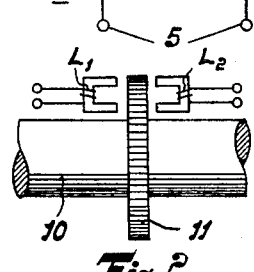
Fig. 2 is a schematic diagram of the positioning of selected elements of the apparatus of Fig. 1 for a desired function.

If the device serves to measure the displacement of a shaft, the inductors L1 and L2 may be constituted by the coils of magnetic cores, which are arranged in the manner shown in Fig. 2. Referring to Fig. 2, reference numeral 10 designates the shaft of a rotating machine, for example, a turbine; 11 designates a ring of magnetic material, seated on the shaft and rotating between the U-shaped, laminated cores of the two identical coils L1 and L2. It is assumed that in the normal axial position of the shaft, the ring is located just in the center between the two cores, the inductors L1 and L2 being then equal to one another in inductance value. According as the ring 11, due to an axial displacement of the shaft 10, approaches one core or the other, the inductance of one coil or of the other will increase. In accordance with the axial position of the shaft, the alternating current bridge 1 will be out of equilibrium on one side or on the other.

Figure 3:
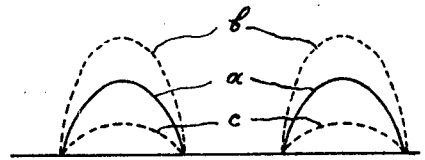
Fig. 3 is a graphical presentation to aid in explaining the operation of the apparatus of Fig. 1 in combination with the positioning of elements of Fig. 2.

The triodes of tube 3 operate as rectifiers for the alternating voltage supplied to the anodes. Referring to Fig. 3, reference $a$ designates the passing current as a function of time, if no alternating voltage prevails across the primary winding of the transformer 2, i. e. if the ring 11 is in the center between the coils L1 and L2. Then equal voltages occur across the anode resistors and the meter 12 does not indicate any deflection. If the shaft 10 is displaced, a voltage occurs across the primary winding of the transformer 2, so that voltages are produced in phase opposition at the grids of the triodes of tube 3. As is evident from Fig. 3, this will have the effect that one triode will take more current (curve $b$) and other triode will take less current (curve $c$). The meter 12 then shows a deflection which varies with the value of the displacement of the shaft. In the case of a displacement of the shaft in the other sense, the meter will have a deflection on the other side. The potentiometer 8 serves to adjust the equilibrium, if no alternating voltage prevails at the grids.

Such a device may also serve to indicate the eccentricity of a rotating body. In this case the coils L1 and L2 are arranged diametrically opposite one another near the body. In this case the output voltage of the bridge is an alternating voltage with the frequency of the auxiliary alternating voltage which is modulated by an alternating voltage, the frequency of which is determined by the speed of the body, the eccentricity of the shaft determining the modulation depth. At a higher speed of the shaft, the meter 12 is replaced by a combination of a rectifier and a meter or a recording device.

For satisfactory operation, the variation occurring at a displacement of the shaft should not produce a variation of the phase shift between the voltages across the inductance branches of the bridge. It is found, however, that this requirement is, in general, not fulfilled. Undesirable phase shifts may occur. Phase shift in the circuits of the coils L1 and L2 depends upon the resistance and inductance of each circuit. Since the inductances vary as the ring 11 changes position, the phase shift varies. The principal object of the present invention is to obviate the effect of any such phase shift on the indication provided by the measuring apparatus.

The invention consists in that the alternating voltage derived from the auxiliary alternating voltage and supplied to the demodulator has a waveform such that a variation of the phase shift between this voltage and the measuring voltage does not substantially affect the deflection of the measuring instrument.

This may be obtained by limiting the auxiliary alternating voltage in a manner such that it is constituted by a succession of fairly sharp voltage peaks or at least of waves, the duration of which is materially shorter than half a period of the alternating supply voltage.

Figure 4:
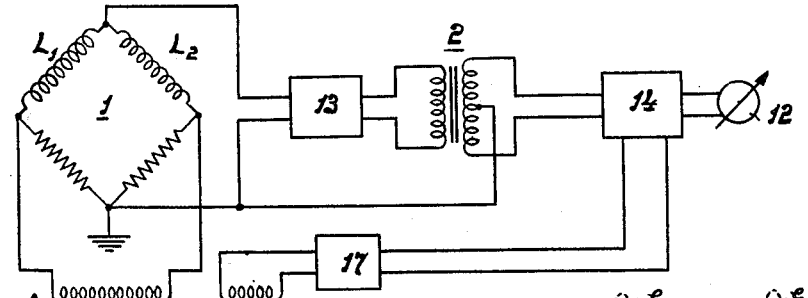
Fig. 4 is a schematic diagram of an embodiment of the measuring apparatus of the present invention.

Fig. 4 shows one embodiment of apparatus according to the invention, in which it is assumed that the measuring voltage proper is supplied by a bridge circuit of the same kind as shown in Fig. 1. The output voltage of the bridge, which is indicative of the magnitude to be measured, is amplified in an alternating current amplifier 13.

The output voltage of the amplifier is supplied to a transformer, the secondary winding of which is connected to the demodulator 14. This demodulator may be of the same kind as shown in Fig. 1. The device 17, through which the auxiliary alternating voltage is supplied to the demodulator 14, is intended to provide a suitable waveform of the auxiliary alternating voltage. This device is fed from the secondary winding of the supply transformer 4, the primary winding of which is connected at 5 to an oscillator. The device 17 may, as an alternative, serve as a phase control-device, by which unwanted phase shifts can be compensated.

Figure 5:
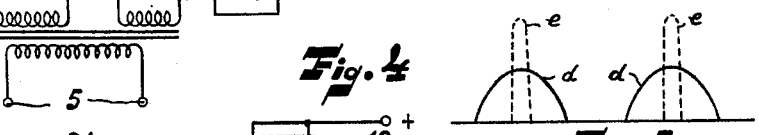
Fig. 5 is a graphical presentation to aid in explaining the operation of the apparatus of Fig. 4.

In the device 17 the curve of the auxiliary alternating voltage derived from the input transformer is distorted in the manner shown in Fig. 5.

In Fig. 5, d designates the curve of the measuring voltage. Provisions are made so that the auxiliary alternating voltage e is approximately a peak voltage and approximately has its maximum value, when the value of the measuring voltage is at a maximum. It is then found that a variation of the phase of a measuring voltage, which becomes manifest in a variation of the relative positions of the curves d and e, does not substantially affect, within certain limits, the indication of the measuring instrument 12.

The device 17 may comprise limiters, for example discharge tubes, which are arranged in a suitable manner. Alternatively, use may be made of circuits having coils with magnetic cores operating in the saturation range.

Figure 6:
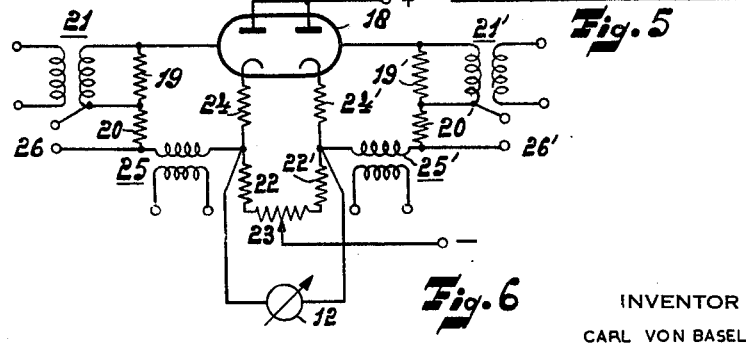
Fig. 6 is a schematic diagram of another embodiment of the measuring apparatus of the present invention.

Fig. 6 shows one embodiment of the apparatus of the present invention, in which the desired effect is obtained directly in the demodulator. In Fig. 6, the demodulator comprises a double triode 18, the cathodes of which are connected to one terminal of the supply via resistors, across which a given bias voltage is produced. This supply may be a source of direct current or of alternating current. The measuring voltage may be derived in the same manner as with the devices shown in Figs. 1 and 4.

One cathode lead includes the resistors 22, 24 and part of the resistor 23; the other cathode lead includes the resistors 22' and 24' and the other part of the resistor 23. Reference numerals 21 and 21' designate transformers, through which the measuring voltage is supplied to the grids in a manner such that they are excited in phase opposition. The grids are connected through resistors 19, 20 and 19' and 20', respectively, and through the secondary windings of transformers 25 and 25' to the common points of the resistors 22 and 24 and 22' and 24', respectively, included in the cathode leads. To the resistors 20 and 20' are connected suitable voltage supplies 26 and 26', respectively, which furnish constant bias voltages to the grids. To the primary windings of transformers 25 and 25' are supplied the auxiliary voltages which are derived from the common auxiliary voltage source in a manner such that the grids obtain equal auxiliary voltages in the same phase. The measuring instrument 12 is connected between the common points of the resistors 22, 24 and 22', 24', respectively.

The voltages across the resistors 20 and 20' may in this case be chosen to be such that the anode current exhibits a curve of the shape e of Fig. 5, so that a phase shift of the measuring voltage within certain limits does not substantially produce a variation of the indication of the instrument.

While the invention has been described by means of specific examples and in specific embodiments, I do not wish to be limited thereto, for obvious modifications will occur to those skilled in the art without departing from the spirit and scope of the invention.

What is claimed is:
1. Apparatus for measuring variations of a quantity from a given value, comprising means for producing a first alternating voltage of given frequency value and having variations as determined by variations of the quantity to be measured, means for producing a second alternating voltage of said given frequency and having a pulse wave shape the cyclic variations of which have a duration less than the duration of the cyclic variations of said first alternating voltage, demodulating means, means for applying said first and second voltages to said demodulating means in a manner whereby a pulse of said second alternating voltage occurs having its maximum magnitude value at substantially the time that a cyclic variation of said first alternating voltage reaches its maximum magnitude value whereby an output voltage of said demodulating means is substantially insensitive to phase variations of said first alternating voltage, and means connected across the output of said demodulating means for indicating variations in the output voltage thereof.

2. Apparatus for measuring variations of a quantity from a given value, comprising means for producing a first alternating voltage of given frequency value and having variations as determined by variations of the quantity to be measured, means for producing a second alternating voltage of said given frequency and comprising a succession of peak voltages the cyclic variations of which have a duration less than half the duration of the cyclic variations of said first alternating voltage, demodulating means, means for applying said first and second voltages to said demodulating means in a manner whereby a pulse of said second alternating voltage occurs having its maximum magnitude value at substantially the time that a cyclic variation of said first alternating voltage reaches its maximum magnitude value whereby an output voltage of said demodulating means is substantially insensitive to phase variations of said first alternating voltage, and means connected across the output of said demodulating means for indicating variations in the output voltage thereof.

3. Apparatus for measuring variations of a quantity from a given value, comprising means for producing a first alternating voltage of given frequency value and having variations as determined by variations of the quantity to be measured, means for producing a second alternating voltage of said given frequency and comprising a succession of peak voltages the cyclic variations of which have a duration time less than half the duration of the cyclic variations of said first alternating voltage, demodulating means comprising a pair of controlled electron discharge systems, a pair of substantially similar circuits connected to the control means of said discharge systems and means for applying an alternating voltage to said demodulating means in a manner such that said discharge systems become periodically inoperative, means for applying said first and second voltages to said demodulating means in a manner whereby a pulse of said second alternating voltage occurs having its maximum magnitude value at substantially the time that a cyclic variation of said first alternating voltage reaches its maximum magnitude value whereby an output voltage of said demodulating means is substantially insensitive to phase variations of said first alternating voltage, the electron discharge systems of said demodulating means being affected in the same sense by said first voltage and in the opposite sense by said second voltage, and means connected across the output of said demodulating means for indicating variations in the output voltage thereof.

4. A measuring device as claimed in claim 3, wherein the control means of said pair of controlled electron discharge systems comprises control grids, and further comprising means for applying an adjusted bias voltage to said control grids in a manner such that the wave shape of the output voltage of said demodulating means is substantially the same as that of said second voltage.

References Cited in the file of this patent
UNITED STATES PATENTS 2,078,796    Greentree et al. _____ Apr. 27, 1937
2,338,732    Nosker _____ Jan. 11, 1944